Nov. 18, 1952     G. A. TINNERMAN ET AL     2,618,033
CABLE CLAMP OR THE LIKE

Filed March 16, 1950     2 SHEETS—SHEET 1

INVENTORS
GEORGE A. TINNERMAN
LAURENCE H. FLORA

BY H. G. Lombard
ATTORNEY

Nov. 18, 1952   G. A. TINNERMAN ET AL   2,618,033
CABLE CLAMP OR THE LIKE

Filed March 16, 1950   2 SHEETS—SHEET 2

INVENTORS
GEORGE A. TINNERMAN
LAURENCE H. FLORA

BY H. G. Lombard
ATTORNEY

Patented Nov. 18, 1952

2,618,033

UNITED STATES PATENT OFFICE 2,618,033

CABLE CLAMP OR THE LIKE

George A. Tinnerman and Laurence H. Flora, Cleveland, Ohio, assignors to Tinnerman Products, Inc., Cleveland, Ohio, a corporation of Ohio Application March 16, 1950, Serial No. 150,006

6 Claims. (Cl. 24—81)

This invention relates in general to fastening installations and deals, more particularly, with an improved fastener construction for securing an object or part to an apertured support in a positively locked fastening arrangement.

The invention is directed to a spring fastener of general utility which may be constructed in different forms for various applications and uses, but in any case, is adapted to provide a positively locked securing action in a work opening and otherwise reliably fasten the parts of an assembly under continuously effective spring tension against loosening or displacement under extreme conditions of vibratory motion, and the like.

Many types of clip fasteners, and the like, comprise a shank or stud portion composed of cooperating yieldable shank elements which are receivable in a panel opening by a snap fastening action in an arrangement in which the actual securing action is based more or less entirely on the resilient engagement of such cooperating shank elements with the wall of the panel opening. Clip fasteners of this character have been found to result in an entirely inordinate number of faulty, loose installations due to the fact that such snap fastening shank elements have a decided tendency to snap out of the panel opening just as readily as they are snapped in, particularly in instances where the installation is subject to constant jarring and vibration effects such as takes place in the operation of an automobile, for example.

A primary object of this invention, therefore, is to provide an improved spring fastener having an attaching shank or stud composed of cooperating resilient shank elements which are adapted to be applied by a simple axial force to secured position in a panel opening and under a positive locking action provided by one of said shank elements in abutting engagement with the underside of the panel at a point materially spaced from the panel opening.

Another object of the invention is to provide such a spring fastener having a shank or stud composed of cooperating resilient shank elements and in which the shank element providing the aforesaid positive locking action is in the form of a projecting hook defining a blunt point and a pronounced lateral locking shoulder, while the cooperating shank element closes the open end of said hook in the form in which the fastener is prepared ready for use. The arrangement, accordingly, is such that objectionable tangling of the fasteners by their hooks is avoided while the blunt points on the fasteners advantageously prevent damage to upholstery, or other overlying material, or possible injury to one working in the area in which the fasteners are installed.

A further object of the invention is to provide an improved spring fastener of the kind described comprising a shank or stud composed of a hook-like shank element which is received in a panel opening and engages the underside of the panel at a point materially spaced from the panel opening in a positively locked attachment thereto, together with a cooperating shank element which engages the wall of the panel opening to retain said hook-like shank element against shifting or displacement from applied fastening position in such positively locked attachment to the panel.

Another object of the invention is to provide an improved fastener having the foregoing features of construction, either in whole or in part, and in which the fastener is provided with a generally arched or bowed base that adapts a single size of the fastener for use with panels of different thicknesses.

A further object of the invention is to provide various forms of fasteners such as described in the manner of simple, one-piece sheet metal devices which are cheap and inexpensive to manufacture and lend themselves to economical quantity production in that they may be provided at relatively low cost from ordinary sheet metal strip stock with little loss or waste of material.

Further objects and advantages and other new and useful features of the invention will be readily apparent as the following description proceeds with reference to the accompanying drawings, for purposes of illustration but not of limitation, in which like reference characters designate like parts throughout, and in which.

Figure 3:
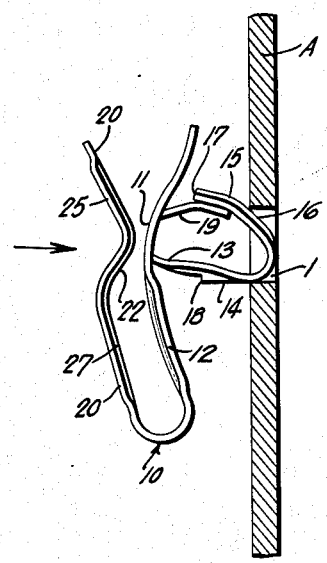
Fig. 3 is a vertical sectional view similar to Fig. 1 showing the fastener as initially applied in the panel opening; and, Fig. 4 is a perspective view of the fastener shown in Figs. 1–3 inclusive, as seen from the underside thereof.
Figure 1:
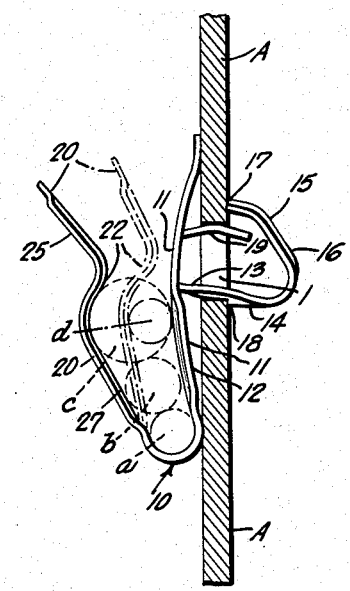
Fig. 1 is a vertical sectional view through an installation showing a cable clamp type of fastener in accordance with the invention as secured in an opening in a relatively thick panel.
Figure 4:
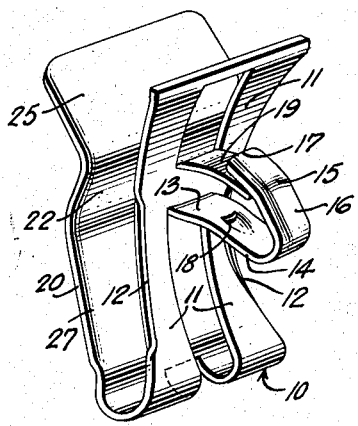
Figure 2:
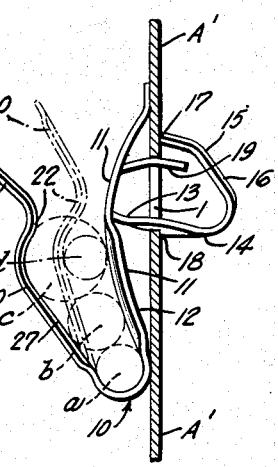
Fig. 2 is a view identical to Fig. 1 showing the same cable clamp type of fastener as secured in an opening in a relatively thin panel.

Referring now, more particularly, to the drawings, Figs. 1-4 inclusive show the invention as embodied in a preferred form of cable clamp for securing one or more cables, tubing, wires, or the like, in mounted position on a supporting panel or plate A, Figs. 1 and 3, or a similar thinner panel A', Fig. 4. Installations of this character have a wide range and variety of applications and uses in automobiles as the means for mounting a combination of conduits such as one or more electrical wires or cables and a gasoline pipe, for example. The panel A is provided with a fastener receiving opening 1 which may be of round, rectangular or other suitable outline so long as it is of a size proportionate to the shank or stud portion of the fastener to be employed to provide for a positive lock thereof in the panel opening, as presently to be described. Preferably the panel opening 1 is provided as an ordinary round hole in any thickness of panel with which the fastener is intended to be used ranging from a relatively thick panel A such as shown in Fig. 1 to a relatively thin panel A' as illustrated in Fig. 2.

The fastener designated generally 10 in Figs. 1-4 inclusive, is a simple formed, inexpensive device which may be constructed of any suitable sheet metal material, preferably spring metal or cold rolled metal having spring-like characteristics. The device may be formed from blanks of various outlines, of course, but from a quantity production standpoint, is most advantageously provided from a comparatively small, generally rectangular blank which may be obtained from standard sheet metal strip stock with little loss or waste of material.

The metal strip forming the body of the fastener is relatively wide compared to the shank or stud elements struck and formed therefrom and consequently, presents wide bearing surfaces for firmly and rigidly retaining an article in mounted position on the panel A while the shank or stud elements require only a comparatively small opening in the panel for securing the fastener in applied position. In forming the fastener 10, Figs. 1-4 inclusive, a portion of such a strip, accordingly, defines a relatively wide base 11 which preferably is bowed or arched intermediate its ends and provided with rounded rib-like edge portions 12 which prevent chafing of the articles secured by the fastener and otherwise stiffen said fastener base 11 to add to effectiveness of the securing action of the fastener in attached position.

A shank element 13 is struck and formed from the material of said fastener base 11 and the adjoining end portion to depend from substantially the apex of the bow or arch formed therein. Said shank element 13 is, in effect, a stamped out strip which comprises an integral dependant leg portion 14 projecting generally normally from the underside of the fastener base and which is formed in a bulbous return bend defining a blunt point and a return bent hook portion 15 on the free end of the strip which is yieldable relatively to said dependant leg portion 14. The said hook portion 15 extends upwardly from the blunt point of the dependant leg 14 in the manner of a diverging guide surface 16 merging with an inwardly bent end portion which defines a pronounced locking shoulder 17 on the extremity of said hook portion 15. A complementary shoulder 18 is provided at a corresponding point on the dependant leg 14, by means of a small transverse slit, Fig. 4, with the material adjoining said slit pressed outwardly out of the plane of said leg 14 to define the desired locking shoulder 18 thereon.

Preferably, the strip 13 defining said dependant leg 14 and the hook portion 15 carried thereby is provided throughout its length in the manner of a slight corrugation which presents a rounded outer surface conforming to the contour of the circular panel opening 1 and otherwise adds to the strength of said dependant leg 14 and hook portion 15.

As seen in Fig. 4, the cooperating shank element 19 is stamped from the opposite end portion of the fastener base 11 and is bent to the underside thereof to define a lug or tab having a spacing from the dependant leg 14 a distance slightly greater than the diameter of the panel opening 1. The shank elements 14 and 19, accordingly, are provided in the normal condition of the fastener substantially as shown in Fig. 3, and in the fabrication thereof, the shank element 19 is first bent to its proper position and the hook portion 15 on the dependant leg 14 then bent to overlap said shank element 19 to form the completed stud or shank in the manner of a closed loop which prevents objectionable tangling of the fasteners by their hook portions.

The fastener 10 is provided with article holding means formed from portions on either or both ends of the fastener base 11. In the cable clamp type of fastener shown in Figs. 1-4 inclusive, an extension 20 is provided in a return bend defining a spring arm or clamp overlying the fastener base 11 and adapted to cooperate therewith in holding one or more articles a, b, c, such as cables, conduits, tubing, or the like.

The spring arm 20 is formed with an inward abutment 22 which merges into an outwardly flared, relatively long tongue 25 that facilitates the introduction of the cables or conduits to be retained under the spring arm 20. As illustrated in Figs. 1 and 2, the arrangement is such that the spring arm 20 is adapted to retain a group of cables or conduits a, b, c, of different cross-sections and of any size from a large size cable c to a small size cable or wire d, for example. Preferably, the spring arm 20 is also provided with rounded longitudinal edge portions 27 which minimize possible chafing of the articles secured thereby due to vibration effects, and the like.

The completed fastener 10, accordingly, is provided substantially as shown in Figs. 3 and 4, with the shank leg 14 and hook portion 15 having a normal spacing considerably greater than the diameter of the panel opening 1. In the initial step for applying the fastener shank to secured position in the panel opening 1, the blunt point of the shank is entered into the panel opening 1 to a position in which the leg 14 and diverging guide surface 16 seat against opposing edge portions of the panel opening. An axial thrust-like force is then applied to the arched or bowed fastener base 11 in the region of the apex thereof to flatten the base as necessary to push the shank through the panel opening to the position shown in Fig. 1. Under such axial force, the diverging guide surface 16 on the hook portion 15 cams against the adjacent edge of the panel opening 1 and causes a gradual compression of said hook portion 15 toward the dependant leg 14 with the shank element 19 yielding slightly inwardly at the same time. This permits the hook portion 15 to pass through the panel opening 1 until the locking shoulder 17 on the extremity thereof clears the rearward side of the panel A, whereupon said compressed hook portion 15 is free to expand and automatically project the locking shoulder 17 into engagement with the panel at a point materially spaced from the panel opening 1, substantially as shown in Figs. 1 and 2.

The inherent resiliency of said hook portion 15 maintains the same in such expanded condition that the locking shoulder 17 is permanently retained in engagement with the panel at a point materially spaced from the panel opening 1, as aforesaid. In the applied position of the locking shoulder 17, the complementary shoulder 18 on the dependant leg 14 also clears the panel opening 1 and engages a marginal portion thereof under the spring force of the shank element 19, thereby preventing any tilting of said leg 14 which might tend to displace the fastener from its applied fastening position. The shank element 19 cooperates with the dependant leg 14 in engaging opposing wall portions of the panel opening 1 to retain the fastener against shifting or displacement from its fully attached position in which the pronounced shoulder 17 on the extremity of the hook 15 provides a positive locking of the shank in the panel opening 1, as aforesaid. Upon release of pressure on the flattened fastener base 11, said base attempts to assume its initial arched or bowed configuration and thereby exerts an axial drawing action on the dependant leg 14 and hook portion 15 to draw the locking shoulder 17 into firm and rigid positive locking relation with the panel, as aforesaid.

In any event, the projecting locking shoulder 17 on the extremity of the hook portion 15 engages the rearward side of the panel A at a point materially spaced from the panel opening 1 in a firm, rigid and positive locking action. The locking shoulder 17 is retained in such positively locked fastening position by the shank element 19 and leg 14 engaging opposing wall portions of the panel opening 1 and consequently, said locking shoulder 17 cannot move of its own accord in the reverse direction toward removal through the panel opening 1. In effect, the described locking action of the locking shoulder 17 prevents any reverse movement of the shank from the panel opening 1 except by such distortion and deformation of the hook portion 15 that the fastener is virtually destroyed.

An important advantage of the fastener of this invention resides in the fact that a single size of the fastener may be applied with equal effectiveness to similar openings in panels of different thicknesses ranging from a relatively thick panel, as shown in Fig. 1, to a relatively thin panel, as seen in Fig. 2. This wide range of application of the fastener is provided for by the bowed or arched construction of the base 11 which exerts an axial pulling force on the dependant leg 14 for drawing the locking shoulder 17, in its aforesaid locking position, into firm rigid engagement with the rearward side of any thickness of panel with which the fastener is intended to be used. The bowed or arched fastener base 11 thus serves in the manner of a yieldable take-up means that adapts a single size fastener for use with an entire range of panels of different thicknesses which, of course, greatly simplifies the problems involved in the manufacture and stocking of the fasteners, as may be readily understood.

Figure 5:
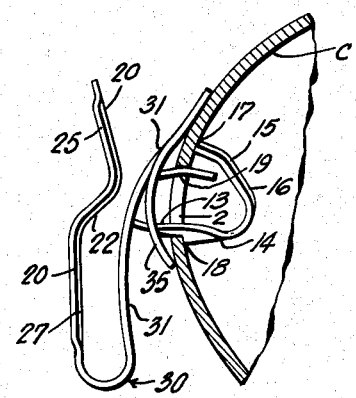
Fig. 5 is a vertical sectional view showing another cable clamp type of fastener in accordance with the invention as provided for a rigid positively locked attachment to a curved panel surface; and, Fig. 6 is a perspective view of the fastener shown in Fig. 5 as seen from the underside thereof.
Figure 6:
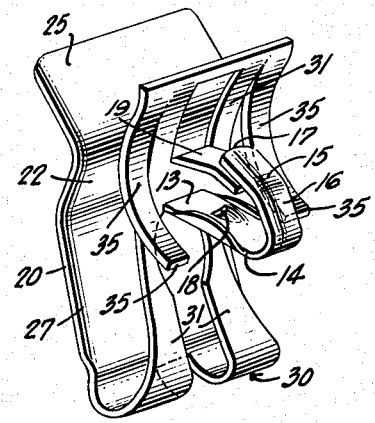

Figs. 5 and 6 disclose another form of fastener 30 in accordance with the invention that is generally similar in construction, application and use to that described with reference to Figs. 1-4 inclusive, but which is particularly adapted for attachment to a curved panel surface C, or the like, to provide a firm seating of the fastener on such a curved surface with the shank thereof locked in the panel opening in such attached position.

The fastener base 31 in this form of the invention is provided in the same general manner with a spring retaining arm 20 and similar cooperating shank elements 14, 19, which are receivable in a positively locked attachment in the panel opening 2 in the generally curved panel or plate member C. Frequently a curved panel or plate member C of this character has such a pronounced curvature that the arched base 31 of the fastener is not adapted to seat firmly and rigidly thereon in the most effective manner. Accordingly, to this end, the said fastener base 31 is made in a slightly greater width providing sufficient material for the formation of a pair of resilient spring fingers 35 which are stamped from the sides of the base and bent to project in resilient relation to the underside of said base. As seen in Fig. 5, the extremities of said spring fingers 35 cooperate with the free end of the base 31 in engaging the curved panel surface C at suitably spaced points in such a way that the fastener seats firmly and rigidly thereon in attached position. This form of fastener, accordingly, is adapted for a quick and easy attachment to locked position in the panel opening 2 in substantially the same manner described in reference to Figs. 1-4 inclusive, and in the applied position of the fastener, the resilient spring fingers 35, which actually are a part of the fastener base, compensate for the pronounced curvature of such a curved panel or plate member C and seat the fastener firmly and rigidly in locked position thereon.

Figure 7:
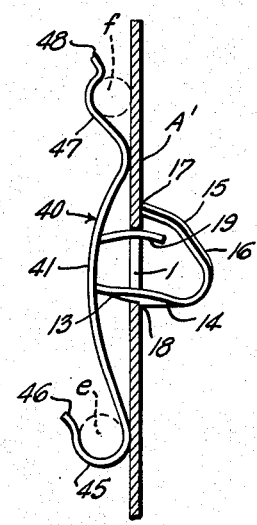
Fig. 7 is a vertical sectional view showing a further form of cable clamp in accordance with the invention as secured in a positive lock in a panel opening.

Fig. 7 discloses a further form of the invention comprising a fastener 40 which is constructed similarly to that of Figs. 1-4 inclusive with the same general type of arched or bowed base 41 together with cooperating shank elements 14, 19. This form of the invention includes a spring arm provided at either end of the fastener base 41 for separately accommodating cables, tubing or similar articles of the same or different diameters. One end of the base 41 is provided with a simple U-shaped spring arm 45 which is adapted for a snap fastening action with the article e secured thereby in a manner to retain such article between said spring arm 45 and the adjacent surface of the fastener base. Preferably such a spring arm 45 is provided with an outwardly flared extremity 46 which facilitates the application of the article e to snap fastened position between the spring arm 45 and the adjacent portion of the fastener base 41. At the other end of the fastener base 41, an extension is provided in the form of a spring arm 47 which is adapted to clamp an article f against the adjacent surface of the panel A' to which the fastener is secured. Preferably such a spring arm is provided with a similar outwardly flared extremity 48 which, likewise, facilitates the attachment of the article f between said spring arm 47 and the adjacent surface of the panel A'.

Figure 8:
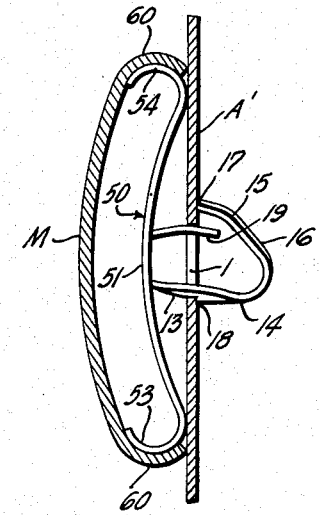
Fig. 8 is a sectional view of a molding installation embodying another form of fastener in accordance with the invention.

Fig. 8 shows a further embodiment of the invention as provided in the form of a fastener 50 for mounting a molding or other chanel-shaped object in a manner whereby both the fastener and molding may be applied in an operation taking place entirely from the forward side of the supporting panel A' in an installation which is especially advantageous in blind locations where the reverse side panel is not conveniently or readily accessible. This form of fastener is provided with the same general type of arched or bowed base 51 carrying similar securing means comprising the cooperating shank elements 14, 19. On either end or side of the base portion 51 there are provided suitable spring arms 53, 54, onto which side flanges 60 of the molding M or other channel-shaped object may be sprung to be retained in fixedly and rigidly mounted position on the supporting panel, substantially as shown in Fig. 8, it being understood that as many fasteners 50 as are necessary are attached to the supporting panel A' along the path which the molding M extends in mounted position and are secured in individual panel openings 1 substantially in the manner described with reference to Figs. 1 to 4 inclusive.

The improved fastener in any form preferably is constructed of relatively thin sheet metal the thickness and width of which is selected according to service requirements and the predetermined size of the parts of the assembly or the articles to be secured. The fastener is most effective when provided of spring metal suitably spring tempered and otherwise treated to give the desired toughness and hardness, particularly in the case of assemblies which are subject to extreme conditions of vibration. A cheap and highly effective fastener may be provided from cold rolled metal such as cold rolled steel which is untempered but of a spring metal nature and capable of providing an effective and reliable fastener, as and for the purposes described.

While the invention has been described in detail with specific examples, such examples are intended as illustrations only inasmuch as it is quite apparent that various changes and modifications may be provided without departing from the spirit and scope of the invention.

What is claimed is:

1. A fastener comprising a piece of sheet metal bent to define a base and a shank projecting from said base receivable in a work opening, said shank comprising a pair of spaced shank elements in opposite substantially aligned relation, one of said shank elements extending toward and around the other shank element into a portion directed toward said base and defining a shoulder for engaging a surface of the work adjacent said opening in cooperation with said base engaging the opposite surface of the work in the secured position of the fastener.

2. A fastener comprising a piece of sheet metal bent to define a base and a shank projecting from said base receivable in a work opening, said shank comprising a pair of spaced shank elements of unequal length in opposite substantially aligned relation, the longer shank element extending toward and around the shorter shank element into a portion directed toward said base and defining a shoulder for engaging a surface of the work adjacent said opening in cooperation with said base engaging the opposite surface of the work in the secured position of the fastener, said shorter shank element being disposed inwardly of said shoulder and engageable with the wall of said work opening in said secured position of the fastener.

3. A fastener comprising a piece of sheet metal bent to define a generally arched base and a shank projecting from the concave side of said base receivable in a work opening, said shank comprising a pair of spaced shank elements of unequal length in opposite substantially aligned relation, the longer shank element comprising a hook extending toward and around the shorter shank element and forming substantially a closed loop with said shorter shank element, said hook terminating in a portion directed toward said base and defining a shoulder for engaging a surface of the work adjacent said opening in cooperation with said generally arched base engaging the opposite surface of the work in the secured position of the fastener, said shorter shank element being disposed within said hook and inwardly of said shoulder and being engageable with the wall of said work opening in said secured position of the fastener.

4. A fastener for an article such as a cable or conduit, or the like, said fastener comprising a piece of sheet metal bent to define a generally arched base and an arm extending above the convex side of said generally arched base adapted to hold said article between said base and arm, a shank projecting from the concave side of said base receivable in a work opening, said shank comprising a pair of spaced shank elements of unequal length in opposite substantially aligned relation, the longer shank element comprising a leg depending from said base in the form of a longitudinal corrugation and having an outwardly projecting shoulder, said leg carrying a hook extending toward and around the shorter shank element and forming substantially a closed loop with said shorter shank element, said hook having its end extending toward said base and defining a shoulder, said shoulder defined by the end of the hook and said shoulder on said leg both being engageable with one surface of the work adjacent said opening with said generally arched base engaging the opposite surface of the work in the secured position of the fastener, and said shorter shank element being disposed within said hook and inwardly of said shoulder and being engageable with the wall of said work opening in said secured position of the fastener.

5. A fastener comprising a piece of sheet metal bent to define a base and a shank projecting from the underside of said base comprising a pair of spaced shank elements in opposite and substantially aligned relation, one of said shank elements extending toward and around the other shank element into a portion directed toward said base and defining a shoulder, said base being adapted to be secured over an opening in work having a curved outer surface with an end portion of said base bearing on one level said curved outer surface, means projecting from the underside of said base in spaced relation to said end portion of the base adapted to bear on another level of said curved outer surface in the secured position of the fastener, and said shank being receivable in said work opening in said secured position of the fastener with said shoulder engageable with the undersurface of the work adjacent said opening.

6. A fastener comprising a piece of sheet metal bent to define a base and a shank projecting from the underside of said base comprising a pair of spaced shank elements of unequal length in opposite substantially aligned relation, the longer shank element comprising a hook extending toward and around said shorter shank element and forming substantially a closed loop with the shorter shank element, said hook terminating in a portion directed toward said base and defining a shoulder, said base being adapted to be secured over an opening in work having a curved outer surface with an end portion of said base bearing on one level said curved outer surface, a pair of spaced fingers projecting from the underside of said base in spaced relation to said end portion of the base adapted to bear on another level of said curved outer surface in the secured position of the fastener, and said shank being receivable in said work opening in said secured position of the fastener with said shoulder engageable with the undersurface of the work adjacent said opening and said shorter shank element engageable with the wall of said opening.

GEORGE A. TINNERMAN.
LAURENCE H. FLORA.

REFERENCES CITED

The following references are of record in the file of this patent:

UNITED STATES PATENTS

| Number | Name | Date |
|---|---|---|
| 2,068,633 | Upham | Jan. 19, 1937 |
| 2,080,769 | Fitts | May 18, 1937 |
| 2,084,717 | Wiley | June 22, 1937 |
| 2,128,005 | Lombard | Aug. 23, 1938 |
| 2,223,622 | Kost | Dec. 3, 1940 |
| 2,246,720 | Churchill | June 24, 1941 |
| 2,454,894 | Tatom | Nov. 30, 1948 |